(12) United States Patent
Ohtsuki et al.

(10) Patent No.: US 7,350,976 B2
(45) Date of Patent: Apr. 1, 2008

(54) BEARING FOR A WHEEL OF VEHICLE (75) Inventors: Hisashi Ohtsuki, Iwata (JP); Koji Nishino, Iwata (JP)

(73) Assignee: NTN Corporation (JP)

( * ) Notice: Subject to any disclaimer, the term of this patent is extended or adjusted under 35 U.S.C. 154(b) by 621 days.

(21) Appl. No.: 10/826,549

(22) Filed: Apr. 16, 2004

(65) Prior Publication Data
US 2004/0228556 A1 Nov. 18, 2004

(51) Int. Cl.
*F16C 33/76* (2006.01)

(52) U.S. Cl. .................. 384/448; 384/489; 384/484

(58) Field of Classification Search .......... 384/489, 384/544, 478, 480, 484, 486, 448; 277/317
See application file for complete search history.

(56) References Cited

U.S. PATENT DOCUMENTS

| 5,407,213 | A | 4/1995 | Ouchi et al. |
| 5,431,413 | A | 7/1995 | Hajzler |
| 5,611,545 | A | 3/1997 | Nicot |
| 6,672,769 | B2 * | 1/2004 | Toda et al. .................. 384/544 |
| 6,682,221 | B2 * | 1/2004 | Rutter et al. ................ 384/448 |

FOREIGN PATENT DOCUMENTS

JP 2001-215132 8/2001

* cited by examiner

*Primary Examiner*—William C. Joyce
(74) *Attorney, Agent, or Firm*—Harness, Dickey & Pierce, P.L.C.

(57) ABSTRACT

A vehicle wheel bearing has a sealing device (12) on an inboard side of the bearing with a first sealing plate (23) mounted on an inner ring (3), and a second sealing plate (24) mounted on an outer member (10), arranged opposite to the first sealing plate (23). The first sealing plate (23) has a radially extending portion arranged on the inboard side of the bearing. An encoder (25) is bonded on the radially extending portion. The encoder (25) is made of elastomer material which includes magnetic substance powder. The N and S poles are alternately magnetized along the circumferential direction. The second sealing plate (24) has a substantially "L"-shaped cross-section formed by a cylindrical portion and a radially extending portion. Integral side-lip(s) slidingly contact the radially extending portion of the first sealing plate (23). A protecting cover (27) is mounted on the first sealing plate (23) so that it intimately contacts with the encoder (25).

5 Claims, 9 Drawing Sheets

PRIOR ART

Fig. 9

PRIOR ART

Fig. 10

PRIOR ART

BEARING FOR A WHEEL OF VEHICLE

CROSS-REFERENCE TO RELATED APPLICATIONS

This application claims priority to Japanese Patent Application No. 2003-112329, filed Apr. 17, 2003, and Japanese Patent Application No. 2003-176574, filed Jun. 20, 2003, which applications are herein expressly incorporated by reference.

FIELD OF THE INVENTION

The present invention relates to a bearing for rotatably supporting a wheel of vehicle, such as an automobile, relative to a body of the vehicle, and more particularly, to an improvement of a sealing structure including an integrally mounted magnetic encoder to detect the speed of the wheel rotation.

BACKGROUND OF THE INVENTION

Figure 8:
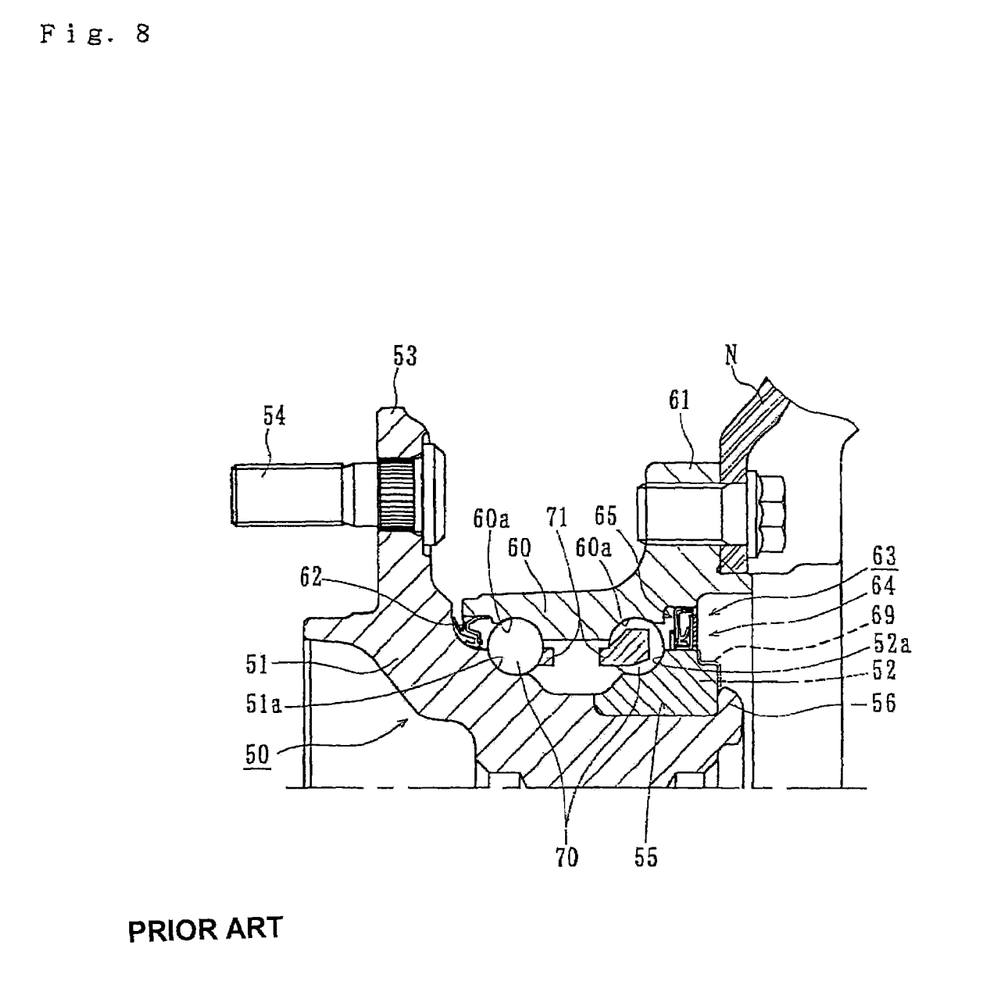
FIG. 8 is a longitudinal-section view of a prior art vehicle wheel bearing.

Those skilled in the art are aware of vehicle wheel bearings having sealing devices with integrally mounted magnetic encoders to detect the rotation speed of the wheels. FIG. 8 is a cross-section view of a prior art vehicle wheel bearing. An inner member 50, an outer member 60, and double row rolling elements 70 and 70 are arranged between the inner and outer members 50 and 60. The inner member 50 has a wheel hub 51 and an inner ring 52 fitted on the wheel hub 51. The wheel hub 51 is formed integrally with a wheel mounting flange 53 to mount a wheel (not shown). Hub bolts 54, which secure the wheel, are equidistantly arranged along the periphery of the flange 53. The inner ring 52 is press-fitted on a stepped portion 55, of small diameter, formed on the wheel hub 51. The end of the stepped portion 55 is plastically deformed radially outward to form a caulked portion 56 to prevent the inner ring 52 from being axially moved from the wheel hub 51.

The outer member 60 is formed integrally with a body mounting flange 61 to be mounted on a knuckle "N" at its periphery. The outer member 60 also has double row outer raceway surfaces 60a and 60a at an inner circumferential surface opposite to the inner raceway surfaces. In the inner member 50, double row inner raceway surfaces 51a and 52a are formed on the outer circumferential surfaces of the wheel hub 51 and the inner ring 52, respectively, opposite of the double row outer raceway surfaces 60a and 60a of the outer member 60. Double row rolling elements (balls) 70 and 70 are arranged between the outer and inner raceway surfaces 60a and 51a; 60a and 52a. The rolling elements are held to be freely rolled by cages 71 and 71. Sealing devices 62 and 63 are mounted on the ends of the outer member 60 to prevent leakage of lubricating grease contained within the bearing. The sealing devices 62 and 63 also prevent penetration of rain water or dusts into the bearing from ambient. Bearings having such a structure are called "third generation".

Figure 9:
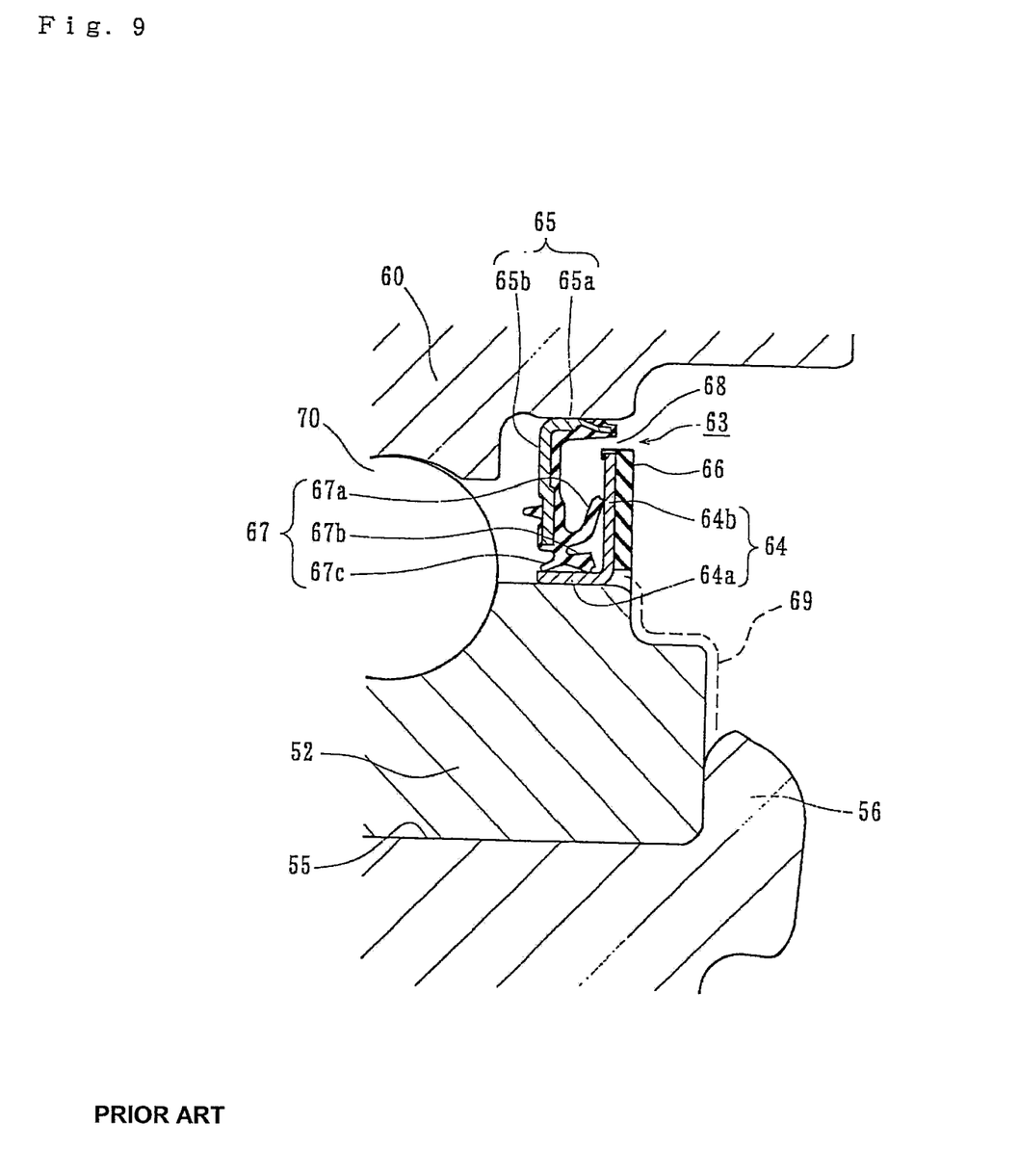
FIG. 9 is a partially enlarged longitudinal-section view of FIG. 8.

In such a vehicle wheel bearing, the sealing device 63, as clearly shown in an enlarged view of FIG. 9, has first and second annular sealing plates 64 and 65 mounted on the inner ring 52 and the outer member 60, respectively. Each of these sealing plates 64 and 65 has a substantially "L"-shaped cross-section formed respectively by a cylindrical portion 64a and 65a and a radially extending portion 64b and 65b. The sealing plates 64 and 65 are arranged opposite to each other. The radially extending portion 64b of the first sealing plate 64 has an encoder 66 to detect the wheel rotation speed.

The encoder is bonded, via vulcanization, at inboard side of the bearing. The encoder 66 is made of a rubber magnet where magnetic substance powder is mingled in the material and N and S poles are alternately magnetized along the circumferential direction of the encoder.

The second sealing plate 65 has a sealing member 67 bonded to it via vulcanization. An integrally formed side-lip 67a slide-contacts with the radially extending portion 64b. The other integrally formed radial-lips 67b and 67c slide-contact with the cylindrical portion 64a. A tip of the radially extending portion 64b of the first sealing plate 64 is opposed to the cylindrical portion 65a of the second sealing plate 65 with a slight radial gap formed therebetween to provide a labyrinth seal 68.

The first sealing plate 64 forms a slinger and is press-fitted on the outer circumferential surface of the inner ring 52, however, traces of water may penetrate into the inside of bearing through the fitted portion. Penetration of water not only degrades the lubricating grease, but reduces the life of the bearing through the generation of rust in the first sealing plate 64 and thus wear of the sealing lips.

Figure 10:
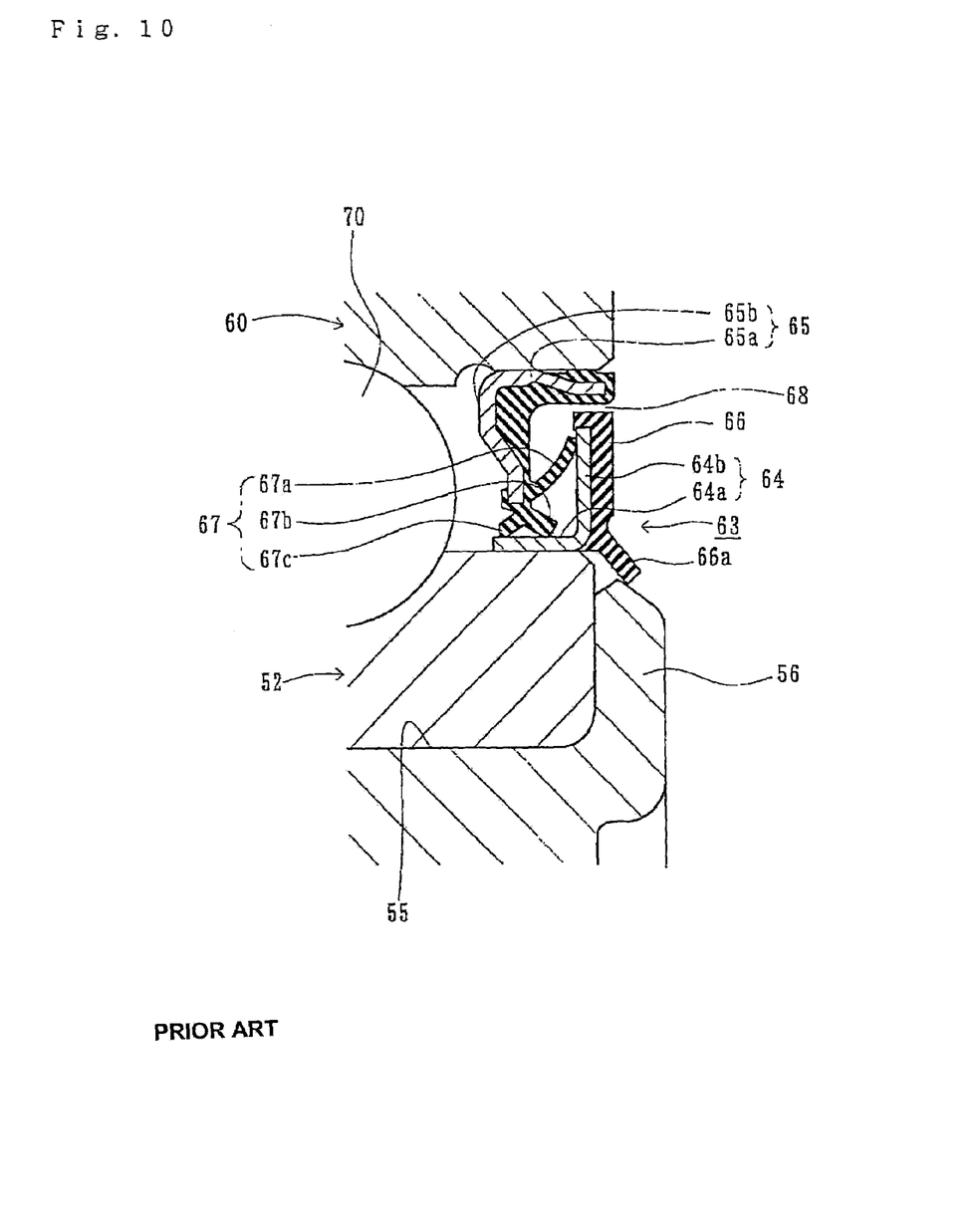
FIG. 10 is a longitudinal-section view of another prior art vehicle wheel bearing.

Applicant of the present invention has proposed in Japanese Laid-open Patent Publication No. 215132/2001, a sealing structure shown in FIG. 10, to overcome this problem. According to this sealing structure, a projected piece 66a, extending from the encoder 66, elastically contacts the caulked portion 56 to seal an exposed surface 69 (see FIG. 9) of the inner ring 52. The piece also prevents water from penetrating into the bearing through the abutted surface between the end face of the inner ring 52 and the caulked portion 56.

Since the rubber magnet member forming the encoder 66 is mingled with a great deal of magnetic powder, it becomes not only expensive but lacks appropriate elasticity. In addition, hoop stress is sometimes caused between the fitted surfaces of the inner ring 52 and the sealing plate 64 by the radial plastic deformation of the stepped portion 55 due to caulking working. If corrosion occurs in this fitted portion under such circumstances, the diffusible hydrogen existing in nature will penetrate into the metallographic structure of the inner ring 52 and destroy the metallic grain bond and cause undesirable so-called "delayed fracture".

In addition, since the surface of the encoder 66 is exposed to the circumstance and arranged opposite to a speed sensor (not shown), via a predetermined gap, dusts or sand, penetrates into the gap and wears their surface. Increase of the air gap between the encoder 66 and the speed sensor, due to wear, causes reduction of the accuracy of detection.

SUMMARY OF THE INVENTION

It is an object of the present invention to provide a bearing for a wheel of vehicle, having a magnetic encoder, which can prevent the penetration of water through the fitted portion of the sealing plate. This improves the life of the bearing and also protects the encoder.

According to one aspect of the present invention, a vehicle wheel bearing comprises an inner member with a wheel hub integrally formed with a wheel mounting flange at one end. An inner raceway surface is formed on the inner member at an outer circumferential surface. A stepped portion, of small diameter, axially extends from the inner raceway surfaces. An inner ring is fitted on the stepped portion and formed with another inner raceway surface on an outer circumferential surface. An outer member is integrally formed with a body mounting at its periphery. Double row outer raceway surfaces are formed on the outer part on an inner circumferential surface opposite to the inner raceway surfaces. Double row rolling elements are arranged between the outer and inner members. A sealing devices seals annular spaces between the outer and inner members. The inner ring is secured to the wheel hub. The inner ring is non-axially movable relative to the wheel hub by a caulked portion formed by plastically deforming radially outward the end of the stepped portion of the wheel hub. A sealing device and an inboard side of the sealing devices comprises a first sealing plate arranged on the inner ring. A second sealing plate is arranged on the outer member opposite to the first sealing plate. The first sealing plate has a radially extending portion arranged at the inboard side of the bearing. An elastomer material is bonded on the radially extending portion of the first sealing plate. The elastomer material includes a magnetic substance powder and N and S poles are alternately magnetized along its circumferential direction. The second sealing plate has a substantially "L"-shaped cross-section formed by a cylindrical portion and a radially extending portion. The second sealing plate is integrated with side-lip(s) in slide-contact with the radially extending portion of the first sealing plate. The tip of the radially extending portion of the first sealing plate is positioned to keep a slight radial gap relative to the cylindrical portion of the second sealing plate. The exposed portion of the inner ring is covered by the first sealing plate.

Accordingly, the sealing device of the third generation vehicle wheel bearing of the present invention prevents penetration of rain water or dusts into the bearing from the ambient. In addition, since the fitted portion as well as the inner ring are not exposed to ambient, it is possible to prevent progression of corrosion and penetration of diffusible hydrogen in these portions. Hydrogen existing in nature, effects the metallographic structure of the inner ring 52 and destroys the metallic grain boundaries, thus creating undesirable delayed fracture.

The first sealing plate is formed as a cap with a fitted portion that is press-fitted onto the outer circumferential surface of the inner ring. A bottom portion of the cap covers the caulked portion. This structure prevents the fitted portion as well as the abutted portion, between the end face of the inner ring and the caulked portion, from being exposed to ambient.

The first sealing plate is formed as a disk abutted to the end face of the inner ring. The first sealing plate is secured by the caulked portion of the wheel hub. This structure prevents the fitted portion as well as the inner ring from being exposed to ambient and to the generation of rust in the fitted portion of the inner ring.

The first sealing plate has a fitted portion to be press-fitted on the outer circumferential surface of the inner ring. A fixed portion of the sealing plate is to be secured to the end face of the inner ring by the caulked portion of the wheel hub. A recess, to contain the fixed portion, is formed on the caulked portion. This structure can suppress minimum deformation of the first sealing plate caused by the plastic deformation to form the caulked portion.

The elastomer material is bonded to the first sealing plate over a region from the radially outermost end of the radially extending portion to a point radially inward beyond the outer circumferential surface of the inner ring. This structure enables increase of the area of encoder and thus the magnetic force.

According to another aspect of the present invention, a vehicle wheel bearing comprises an inner member with a wheel hub integrally formed with a wheel mounting flange at one end. An inner raceway surface is formed in the wheel hub at an outer circumferential surface. A stepped portion, of small diameter, axially extends from the inner raceway surfaces. An inner ring is fitted on the stepped portion and formed with another inner raceway surface at an outer circumferential surface. An outer member is integrally formed with a body mounting flange at its periphery. Double row outer raceway surfaces are formed in the outer member inner circumferential surface opposite to the inner raceway surfaces. Double row rolling elements are arranged between the outer and inner members. Sealing devices seal annular spaces between the outer and inner members. The inner ring is secured to the wheel hub so as to be non-axially movable relative to the wheel hub by a caulked portion formed by plastically deforming radially outward the end of the stepped portion of the wheel hub. A sealing device at an inboard side of the sealing devices comprises a first sealing plate arranged on the inner ring. A second sealing plate is arranged on the outer member opposite to the first sealing plate. The first sealing plate has a radially extending portion arranged at the inboard side of the bearing. An encoder is bonded on the radially extending portion of the first sealing plate. The encoder includes a magnetic substance powder and N and S poles alternately magnetized along its circumferential direction. The second sealing plate has a substantially "L"-shaped cross-section formed by a cylindrical portion and a radially extending portion. Integral side-lip(s) slidingly-contact with the radially extending portion of the first sealing plate. A protecting cover is mounted on the first sealing plate to intimately contacts with the surface of the encoder. The protecting cover is positioned to keep a slight radial gap relative to the cylindrical portion of the second sealing plate.

Accordingly, the sealing device of the vehicle wheel bearing mentioned above obtains excellent sealing ability preventing penetration of rain water or dusts into the bearing from the ambient. This reduces or eliminates damage of the surface of the encoder which, in turn, enables detecting with unchanged accuracy. In addition, it is also possible to reduce the air gap between the encoder and the vehicle speed detecting sensor. This improves the detecting accuracy as compared with the structure having a separate cover to cover the sealing device.

The protective cover has a cylindrical portion mounted on the outer circumferential surface of the first sealing plate. Also, the cover has a radially extending portion which extends radially inward from the end of the cylindrical portion and contacts the surface of the encoder. This structure is simple and thus enables easy assembly. In addition, it is possible to reduce the air gap between the encoder and the vehicle speed detecting sensor to improve the detecting accuracy.

The first sealing plate is formed as a cap integrally formed with a cylindrical portion formed by folding a portion of the radially extending portion. The folded portion is mounted on the outer circumferential surface of the inner ring. A bottom portion covers the caulked portion. According to this structure, since the fitted portion as well as the inner ring are not exposed to ambient, it is possible to prevent progression of corrosion and penetration of diffusible hydrogen in these portions. The hydrogen which exists in nature enters into the metallographic structure of the inner ring and destroys the metallic grain boundary enabling undesirable delayed fracture.

The protective cover is formed as a cap integrally formed with a cylindrical portion mounted on the outer circumferential surface of the inner ring. A radially extending portion extends radially inward from the end of the cylindrical portion and contacts with the surface of the encoder. A bottom portion covers the caulked portion. According to this structure, it is possible to prevent progression of corrosion and penetration of diffusible hydrogen in these portions. The hydrogen which exists in nature enters into the metallographic structure of the inner ring and destroys the metallic grain boundaries creating undesirable delayed fracture. In addition, since the surface of the encoder is covered by the radially extending portion of the protecting cover, made of non-magnetic material, it is possible to prevent damage of the surface of encoder.

The protecting cover is secured to the first sealing portion by a caulked portion formed on the cylindrical portion of the protecting cover. This structure enables a more positive securement of the protecting cover to the outer circumferential surface of the first sealing plate. The protecting cover is formed by press forming of a non-magnetic steel sheet or by injection molding of synthetic resin.

The second sealing plate is integrally formed with radial-lip(s) directly slide-contacting with the outer circumferential surface of the inner ring. Compact design of the second sealing plate can be obtained by this structure without any restriction as to shape or dimension of the bearing space or sealing plates. The radial-lips can prevent leakage of lubricating grease contained within the bearing. The lips also prevent penetration of rain water or dusts into the bearing from ambient.

As previously stated, according to the first aspect of the present invention, a vehicle wheel bearing comprises an inner member including a hub wheel integrally formed with a wheel mounting flange at one of its ends. Also the wheel hub includes an inner raceway surface formed at an outer circumferential surface and a stepped portion, of small diameter, which axially extends from the inner raceway surfaces. An inner ring is fitted on the stepped portion and includes another inner raceway surface at an outer circumferential surface. An outer member is integrally formed with a body mounting at its periphery. The other member includes double row outer raceway surfaces at an inner circumferential surface opposite to the inner raceway surfaces. Double row rolling elements are arranged between the outer and inner members. Sealing devices seal annular spaces between the outer and inner members. The inner ring is secured to the hub wheel so that it is non-axially movable relative to the hub wheel by a caulked portion formed by plastically deforming radially outward the end of the stepped portion of small diameter of the wheel hub. A sealing device on the inboard side of the sealing devices comprises a first sealing plate arranged on the inner ring. A second sealing plate is arranged on the outer member opposite to the first sealing plate. The first sealing plate has a radially extending portion arranged on the inboard side of the bearing. The radially extending portion of the first sealing plate has a bonded elastomer material with mingled magnetic substance powder. N and S poles are alternately magnetized along the circumferential direction of the elastomer material. The second sealing plate has a substantially "L"-shaped cross-section formed by a cylindrical portion and a radially extending portion. An integrated side-lip(s) slide-contacts with the radially extending portion of the first sealing plate. The tip of the radially extending portion of the first sealing plate is positioned to form a slight radial gap relative to the cylindrical portion of the second sealing plate. The exposed portion of the inner ring is covered by the first sealing plate. According to the characterized features of the sealing device of the vehicle wheel bearing of the present invention, it is possible to prevent penetration of rain water or dusts into the bearing from ambient. In addition, since the fitted portion as well as the inner ring are not exposed to the ambient circumstances, it is possible to prevent progression of corrosion in these portions. Also, prevented is the penetration of diffusible hydrogen, which exist in nature, into the metallographic structure of the inner ring which destroys the metallic grain boundaries which eliminates the generation of undesirable delayed fracture. According to the second aspect of the present invention, a vehicle wheel bearing comprises an inner member including a hub wheel integrally formed with a wheel mounting flange at one end. The inner member also includes an inner raceway surface at an outer circumferential surface and a stepped portion, of small diameter, axially extending from the inner raceway surfaces. An inner ring is fitted on the stepped portion and formed with another inner raceway surface at an outer circumferential surface. An outer member is integrally formed with a body mounting flange at its periphery. Also double row outer raceway surfaces are formed at an inner circumferential surface opposite to the inner raceway surfaces. Double row rolling elements are arranged between the outer and inner members. Sealing devices seal annular spaces between the outer and inner members. The inner ring is secured to the hub wheel so that it is non-axially movable relative to the hub wheel by a caulked portion formed by plastically deforming radially outward the end of the stepped portion, of small diameter, of the wheel hub. A sealing device on the inboard side of the sealing devices comprises a first sealing plate arranged on the inner ring and a second sealing plate arranged on the outer member opposite to the first sealing plate. The first sealing plate has a radially extending portion arranged on the inboard side of the bearing. The radially extending portion of the first sealing plate has a bonded encoder with mingled magnetic substance powder. N and S poles are alternately magnetized along the circumferential direction of the encoder. The second sealing plate has a substantially "L"-shaped cross-section formed by a cylindrical portion and a radially extending portion. Integrated side-lip(s) slide-contact with the radially extending portion of the first sealing plate. A protecting cover is mounted on the first sealing plate so that it contacts with the surface of the encoder. The protecting cover is positioned to provide a slight radial gap relative to the cylindrical portion of the second sealing plate. According to the characterized features of the sealing device of the vehicle wheel bearing of the second aspect, it is possible to obtain excellent sealing ability, to prevent penetration of rain water or dusts into the bearing from ambient and prevent damage of the surface of encoder, and accordingly to keep the detecting accuracy unchanged. In addition, it is also possible to reduce the air gap between the encoder and the vehicle speed detecting sensor. This in turn improves the detecting accuracy as compared with a structure having a separate cover for covering the sealing device.

A vehicle wheel bearing comprises an inner member including a hub wheel integrally formed with a wheel mounting flange at one end. The hub is formed with an inner raceway surface at an outer circumferential surface and a stepped portion, of small diameter, axially extending from the inner raceway surfaces. An inner ring is fitted on the stepped portion and includes another inner raceway surface at an outer circumferential surface. An outer member is integrally formed with a body mounting flange at its periphery and with double row outer raceway surfaces at an inner circumferential surface opposite to the inner raceway surfaces. Double row rolling elements are arranged between the outer and inner members. Sealing devices seal annular spaces between the outer and inner members. The inner ring is secured to the hub wheel so that it is non-axially movable relative to the hub wheel by a caulked portion formed by plastically deforming radially outward the end of the stepped portion of small diameter of the wheel hub. A sealing device on the inboard side of the sealing devices comprises a first sealing plate arranged on the inner ring and a second sealing plate arranged on the outer member opposite the first sealing plate. The first sealing plate has a radially extending portion arranged at the inboard side of the bearing. The radially extending portion of the first sealing plate has an encoder bonded to it. The encoder has mingled magnetic substance powder where N and S poles are alternately magnetized along the circumferential direction. The second sealing plate has a substantially "L"-shaped cross-section formed by a cylindrical portion and a radially extending portion. Integrated side-lip(s) slide-contact with the radially extending portion of the first sealing plate. A protective cover is mounted on the first sealing plate. The protective cover is formed as a cap integrally formed with a cylindrical portion mounted on the outer circumferential surface of the first sealing plate, a radially extending portion extending radially inward from the end of the cylindrical portion and intimately contacted with the surface of the encoder, and a bottom portion covers the end of the inner ring and caulked portion. The protecting cover is positioned to provide a slight radial gap relative to the cylindrical portion of the second sealing plate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Preferred embodiments of the present invention will be described with reference to accompanied drawings.

Figure 1:
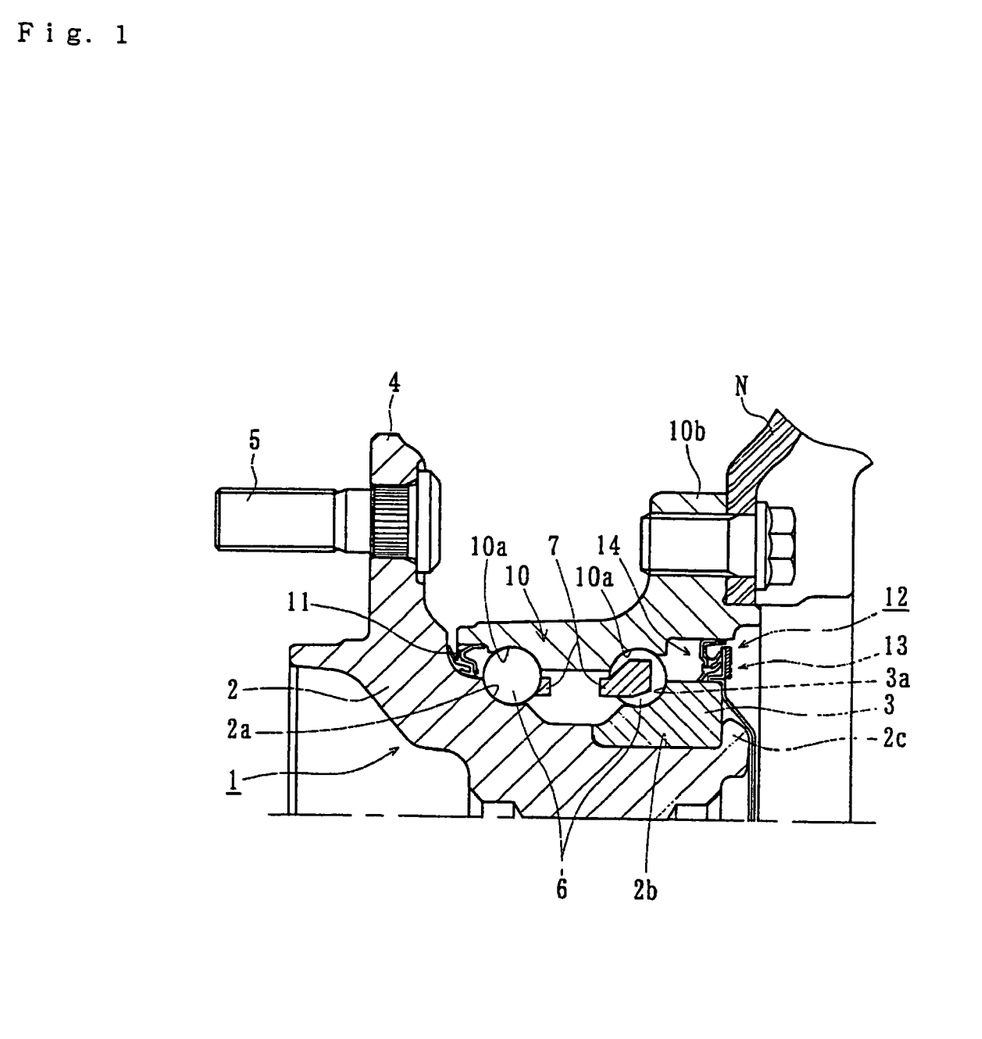
FIG. 1 is a longitudinal-section view of a first embodiment of a vehicle wheel bearing of the present invention.
Figure 2:
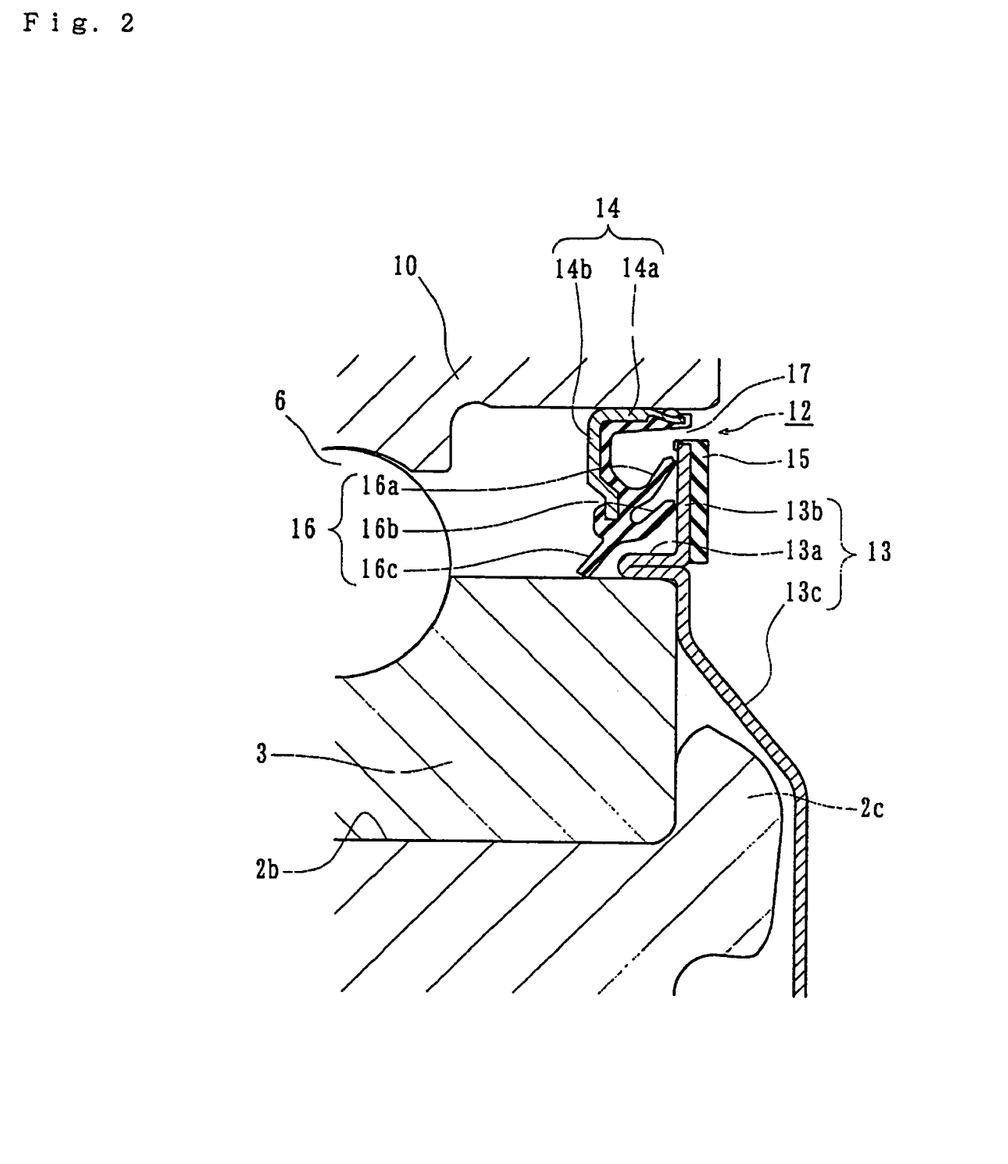
FIG. 2 is a partially enlarged longitudinal-section view of FIG. 1.

FIG. 1 is a longitudinal-section view of a first embodiment of a vehicle wheel bearing of the present invention. FIG. 2 is a partially enlarged longitudinal-section view of FIG. 1. In the description of the present invention, a side of a bearing positioned outward of a vehicle when it is mounted on a vehicle is referred to as "outboard" side (the left side in a drawing), and a side inward of a vehicle is referred to as "inboard" side (the right side in a drawing).

The bearing of FIG. 1 has an inner member 1, an outer member 10, and double row rolling elements 6 and 6 held between the inner and outer members 1 and 10. The inner member 1 includes a wheel hub 2 and a separate inner ring 3 fitted on the outer circumferential surface of the wheel hub 2. The wheel hub 2 is formed integrally with a wheel mounting flange 4 for mounting a wheel (not shown). Hub bolts 5 secure the wheel and are equidistantly arranged along the periphery of the flange 4. The inner ring 3 is press-fitted on a stepped portion 2b, of small diameter, formed on the wheel hub 2. The end of the stepped portion 2b is plastically deformed radially outward to form a caulked portion 2c to prevent the inner ring 3 from being moved axially outward from the wheel hub 2.

The outer member 10 is formed integrally with a body mounting flange 10b to be mounted on a knuckle "N" at its periphery. Double row outer raceway surfaces 10a and 10a are formed on an inner circumferential surface of the outer member 10 opposite to the inner raceway surfaces. In the inner member 1, double row inner raceway surfaces 2a and 3a are formed on the outer circumferential surfaces of the wheel hub 2 and the inner ring 3, respectively. The inner raceway surfaces 2a, 3a are opposite to the double row outer raceway surfaces 10a and 10a of the outer member 60. Double row rolling elements (balls) 6 and 6 are arranged between the outer and inner raceway surfaces 10a and 2a; 10a and 3a. The balls 6 are rollingly held by cages 7 and 7. Sealing devices 11 and 12 are mounted on the ends of the outer member 10 to prevent leakage of lubricating grease contained within the bearing. Also, the sealing devices 11, 12 prevent penetration of rain water or dusts into the bearing from the ambient. The bearing has a so called "third generation" structure. Although a double row angular ball bearing is illustrated, a double row tapered roller bearing may also be used.

The wheel hub 2 is made of medium carbon steel such as S53C including carbon of 0.40~0.80 wt %. The inner raceway surface 2a of the outboard side, the seal land portion, which the sealing device 11 slide-contacts, and the stepped portion 2b, of small diameter, are heat treated by the high frequency induction heating. They have a surface hardness of HRC 58~64. The caulked portion 2c is not heat treated having a surface hardness less than HRC 24 after forging. On the contrary, the inner ring 3 is made of high carbon chrome bearing steel such as SUJ 2. It is hardened to its core by dip quenching to have a surface hardness of HRC 54~64.

The inner member 10 is made of medium carbon steel such as, S53C including carbon of 0.40~0.80 wt %. The double row outer raceway surface 10a and 10a and the inner circumferential surface of the end of the outer member, where the sealing devices 11 and 12 are fitted, are heat treated by high frequency induction heating to have a surface hardness of HRC 58~64.

As clearly shown in FIG. 2, the sealing device 12 on the inboard side has first and second sealing plates 13 and 14 mounted on the inner ring 3 and the outer member 10, respectively. The first sealing plate 13 is formed as a cap within an integrally formed fitted portion 13a formed by folding a portion of the radially extending portion. The fitted portion 13a is mounted on the outer circumferential surface of the inner ring. A radially extending portion 13b extends radially outwardly from the end of the fitted portion 13a. A bottom portion 13c covers the caulked portion 2c. The first sealing plate 13 is made by press working of ferrite-stainless steel sheet (e.g. JIS SUS 430 etc.) or preserved cold rolled steel sheet (e.g. JIS SPCC etc.). A rotary encoder 15 is bonded, by vulcanization, integrally onto the radially extending portion 13b at its inboard side. The rotary encoder 15 detects the speed of wheel rotation. The encoder 15 is made from an elastomer material such as rubber which included a magnetic substance powder, such as ferrite powder. North and South poles are alternately magnetized at a predetermined pitch on the pitch circle diameter (PCD) along the circumferential direction.

The second sealing plate 14 is made of austenitic-stainless steel sheet (e.g. JIS SUS 304 etc.) or preserved cold rolled steel sheet (e.g. JIS SPCC etc.). The sealing plate 14 has a cylindrical portion 14a and a radially extending portion 14b to form a substantially "L" shaped configuration. A sealing member 16 is bonded, by vulcanization, on the second sealing plate 14. The sealing member 16 is integrally formed by side-lips 16a and 16b slide-contacting with the radially extending portion 13b of the first sealing plate 13. A radial-lip 16c slide-contacts with the outer circumferential surface of the inner ring 3. Accordingly, this radial lip 16c makes it possible to positively prevent penetration of rain water or dusts into the bearing from ambient without any restriction. A tip of the radially extending portion 13b of the first sealing plate 13 opposes the cylindrical portion 14a of the second sealing plate 14. A slight radial gap is kept between the radial extending portion 13b and cylindrical portion 14a to form a labyrinth seal 17.

Although the structure is illustrated with a pair of side-lips 16a and 16b and a radial-lip 16c, any other structure such as one having a single side-lip and a pair of radial-lips are in accordance with objects or a space of the sealing device. In addition, it is also possible to provide a pair of radial-lips 16c. One of them may slide-contact with the outer circumferential surface of the fitted portion 13a.

According to the first embodiment, since the first sealing plate 13 is formed as a cap with the bottom portion 13c as well as the folded fitted portion 13a press-fit on the outer circumferential surface of the inner ring 3, the fitted surfaces, inner ring 3, and the abutted surfaces between the inner ring 3 and the caulked portion 2c are never exposed to ambient. Thus, it is possible to prevent the generation of delayed fracture due to penetration of diffusible hydrogen which exists in ambient circumstance, into the metallographic structure of the inner ring 3 when corrosion would proceed in these fitted portions.

Figure 3:
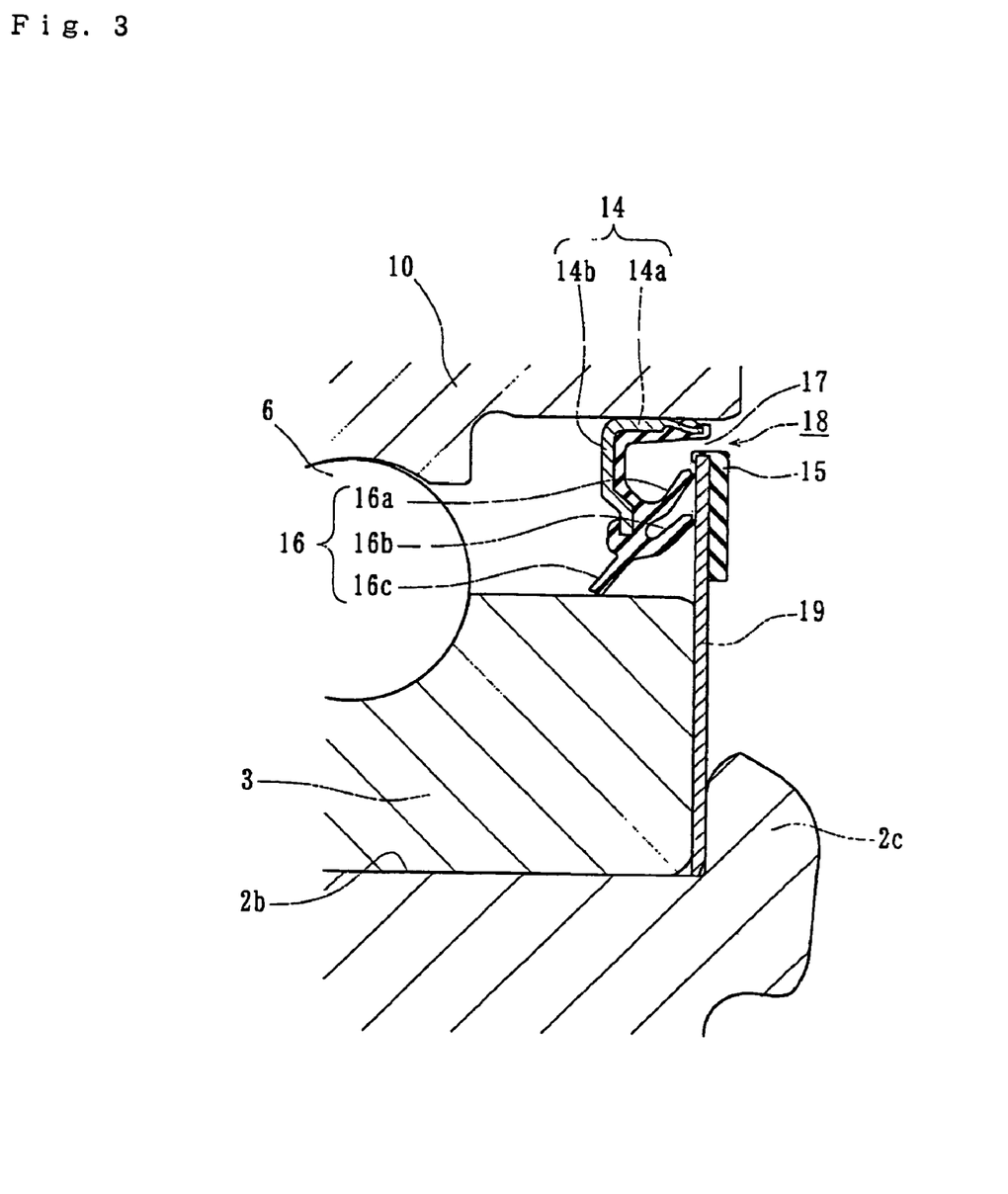
FIG. 3 is a view like FIG. 2 of a second embodiment of a vehicle wheel bearing of the present invention.

A second embodiment of the vehicle wheel bearing is shown in a partially enlarged view of FIG. 3. Since difference of this embodiment from the first embodiment only resides in the structure of the first sealing plate, the same numerals are used as those used in the first embodiment to designate the same structural elements.

Similar to the first embodiment, the second sealing plate 14 is mounted on the outer member 10. However, a first sealing plate 19 of a sealing device 18 on the inboard side of this embodiment is formed in a disk configuration and sandwiched between the end face of the inner ring 3 and the caulked portion 2c. The first sealing plate 19 is made by press working of ferrite-stainless steel sheet (e.g. JIS SUS 430 etc.) or preserved cold rolled steel sheet (e.g. JIS SPCC etc.). A rotary encoder 15 is bonded, by vulcanization, integrally on the radially outward end of the first sealing plate 19 at its inboard side. The rotary encoder 15 is made of elastomer material with magnetic substance powder.

According to this second embodiment, since the first sealing plate 19 is formed as a disk and integrally secured to the end face of the inner ring 3 by plastically deforming the end of the stepped portion 2b of the wheel hub 2, no rain water or dusts penetrates into the bearing from ambient. The fitted surfaces and the inner ring 3 are not exposed to the ambient. Accordingly, the delayed fracture of the inner ring 3 can be prevented.

Figure 4:
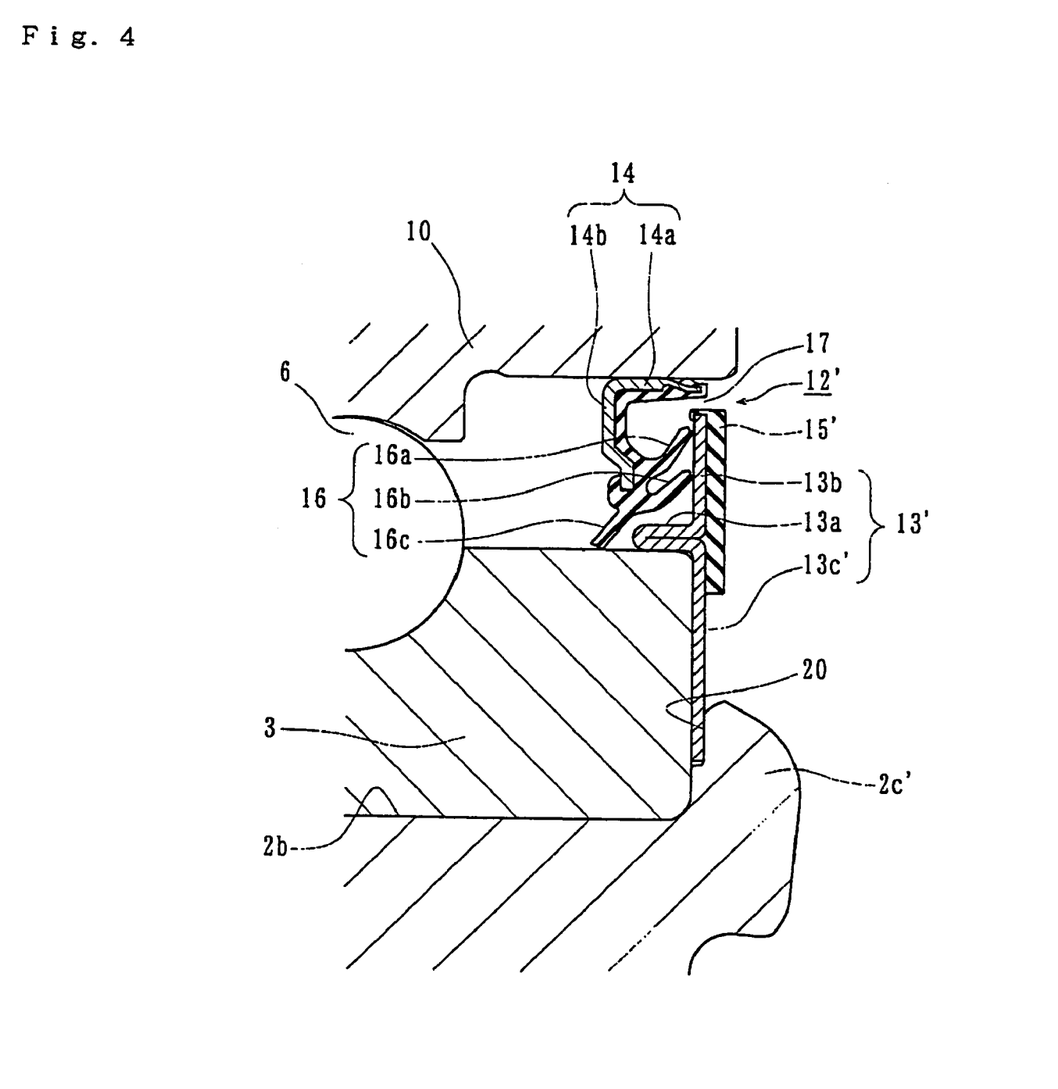
FIG. 4 is a view like FIG. 2 of a third embodiment of a vehicle wheel bearing of the present invention.

A third embodiment of the vehicle wheel bearing is shown in a partially enlarged view of FIG. 4. Since difference of this embodiment from the second embodiment (FIG. 3) only resides in the structure of the first sealing plate and the caulked portion, the same numerals are used as those used in the previous embodiments for designating the same structural elements.

Similarly to the first and second embodiments, the second sealing plate 14 of a sealing device 12' on the inboard side of this embodiment is mounted on the outer member 10. A first sealing plate 13' comprises the fitted portion 13a formed by folding, a radially extending portion 13b extending radially outward from the fitted portion 13a, and a disk shaped fixed portion 13c' abutting to the end face of the inner ring 3. The first sealing plate 13' is integrally secured to the end face of the inner ring 3 by press-fitting the folded portion 13a onto the outer circumferential surface and by plastically deforming the end of the stepped portion 2b of the wheel hub 2 to form the caulked portion 2c'. A recess 20 to contain the fixed portion 13c' is previously formed on the surface of the caulked portion 2c' in order to minimize deformation of the first sealing plate 13' during the plastic deforming. An encoder 15' is bonded integrally on the first sealing plate 19 at its inboard side beyond the radially outward end. The encoder 15' is made of elastomer material which includes a magnetic substance powder.

Similar to the previous embodiments, in this embodiment, no rain water or dusts penetrates into the bearing from ambient circumstances. Since the fitted surfaces and the inner ring 3 are not exposed to ambient, the delayed fracture of the inner ring 3 can be positively prevented. According to this embodiment, since the area of the encoder 15' can be made large, the attractive forces of magnetic poles N and S can also be increased.

Figure 5:
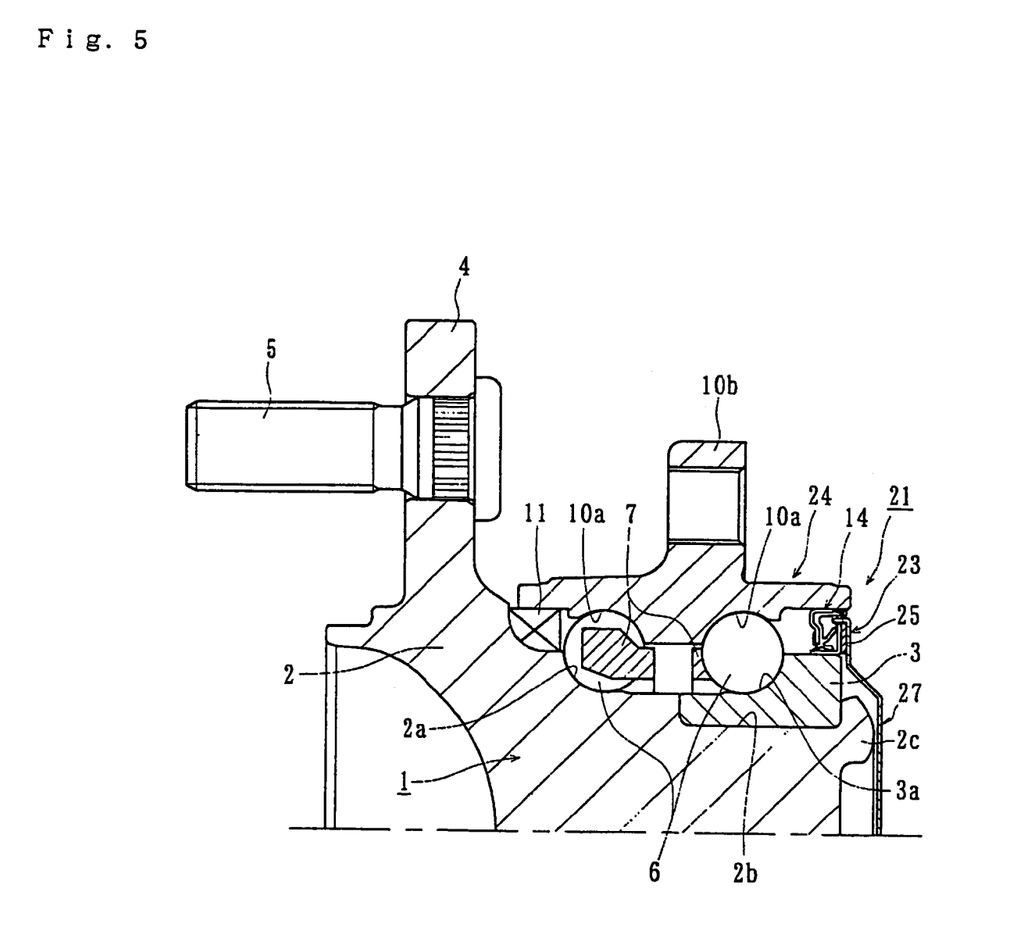
FIG. 5 is a longitudinal-section view of a fourth embodiment of a vehicle wheel bearing of the present invention.

A fourth embodiment of the vehicle wheel bearing is shown in longitudinal cross-section view in FIG. 5. FIG. 6(a) is a partially enlarged view of FIG. 5. Since difference of this embodiment from the previous embodiments only resides in the structure of the sealing device on the inboard side, the same numerals are used as those used in the previous embodiments to designate the same structural elements.

As shown in the enlarged view of FIG. 6(a), the sealing device 21 of inboard side has first and second annular sealing plates 23 and 24 mounted on the inner ring 3 and the outer member 10, respectively. The first sealing plate 23 has a cylindrical portion 23a and a radially extending portion 23b extending radially outward from the end of the cylindrical portion 23a to form a substantially "L" shaped configuration. The first sealing plate 23 is formed by press working of ferromagnetic sheet e.g. ferrite-stainless steel sheet (e.g. JIS SUS 430 etc.) or preserved cold rolled steel sheet (e.g. JIS SPCC etc.). A magnetic rotary encoder 25 is bonded, by vulcanization, integrally on the radially extending portion 23b at its inboard side. The magnetic rotary encoder 25 detects the speed of wheel rotation. The encoder 25 is made of elastomer material such as rubber or sintered metal including a metal binder. A ferromagnetic substance powder, such as ferrite, is mingled into the elastomeric or sintered material. North and South poles are alternately magnetized at a predetermined pitch on the pitch circle diameter (PCD) along the circumferential direction.

The second sealing plate 24 is formed by press working of austenitic-stainless steel sheet (e.g. JIS SUS 304 etc.) or preserved cold rolled steel sheet (e.g. JIS SPCC etc.). The second sealing plate 24 has a cylindrical portion 24a and a radially extending portion 24b extending from the end of the cylindrical portion 24a to form a substantially "L" shaped configuration. A sealing member 26 is bonded, by vulcanization, on the second sealing plate 24. The sealing member 26 is integrally formed by side-lip 26a, which is in slide-contact with the radially extending portion 23b of the first sealing plate 23, and a pair of radial-lips 26b and 26c. The radial lips 26c and 26c slide-contact with the outer circumferential surface of the cylindrical portion 23a.

Although the sealing member 26 is illustrated having the side-lip 26a and a pair of the radial-lips 26b and 26c, any other structure such as one having a pair of side-lips and a single radial-lip are in accordance with objects or a space of the sealing device. In addition, it is also possible to provide a pair of radial-lips and to have one of them in direct slide-contact with the outer circumferential surface of the inner ring 3.

The first sealing plate 23 of this embodiment is provided with a protecting cover 27. The protecting cover 27 is formed by press working of a sheet of non-magnetic material e.g. an austenitic-stainless steel sheet (e.g. JIS SUS 304 etc.) or preserved cold rolled steel sheet (e.g. JIS SPCC etc.). The protecting cover 27 can be made of any non-magnetic material having a surface hardness higher than that of the encoder 25. The protecting cover 27 may be formed of any synthetic resin e.g. polypropylene, polyethylene etc. other than non-magnetic materials mentioned above.

The protecting cover 27 is formed as a cap. The cap includes a cylindrical portion 27 fitted on the outer circumferential portion of the first sealing plate 23. A radially extending portion 27b radially inwardly extends from the end of the cylindrical portion 27a and intimately contacts with the encoder 25 to cover its surface. A bottom portion 27c covers the exposed portions of the inner ring 3 and the caulked portion 2c. The cylindrical portion 24a of the second sealing plate 24 and the cylindrical portion 27a of the protecting cover 27 are arranged to oppose each other and keep a slight radial gap between them to form a labyrinth seal 28.

As shown in FIG. 6(b), it is possible to positively and rigidly secure the protecting cover 27 to the first sealing plate 23 by plastically deforming the tip of the cylindrical portion 27a to form a caulked portion 27d.

The first sealing plate 23 is provided with the cap-shaped protecting cover 27, having the bottom portion 27c, in order to cover the fitted portion of the first sealing plate 23 as well as the exposed portions of the inner ring 3 and the caulked portion 2c. The fitted portion, the inner ring 3 as well as the abutted surface between the end of the inner ring 3 and the caulked portion are thus never exposed to ambient. Accordingly, it is possible to prevent generation of delayed fracture due to penetration of the diffusible hydrogen which exists in ambient into the metallographic structure of the inner ring 3 when corrosion would proceed in these portions. In addition, since the surface of the encoder 25 is covered by the non-magnetic material of the radially extending portion 27b of the protecting cover 27, it is possible to prevent damage of the encoder 25 without having any influence on the detection accuracy. Furthermore, since the air gap between the encoder 25 and the vehicle speed detecting sensor can be substantially reduced, as compared with the structure having a fixed cover mounted on a separate sealing device, it is possible to further improve detection accuracy.

Figure 6:
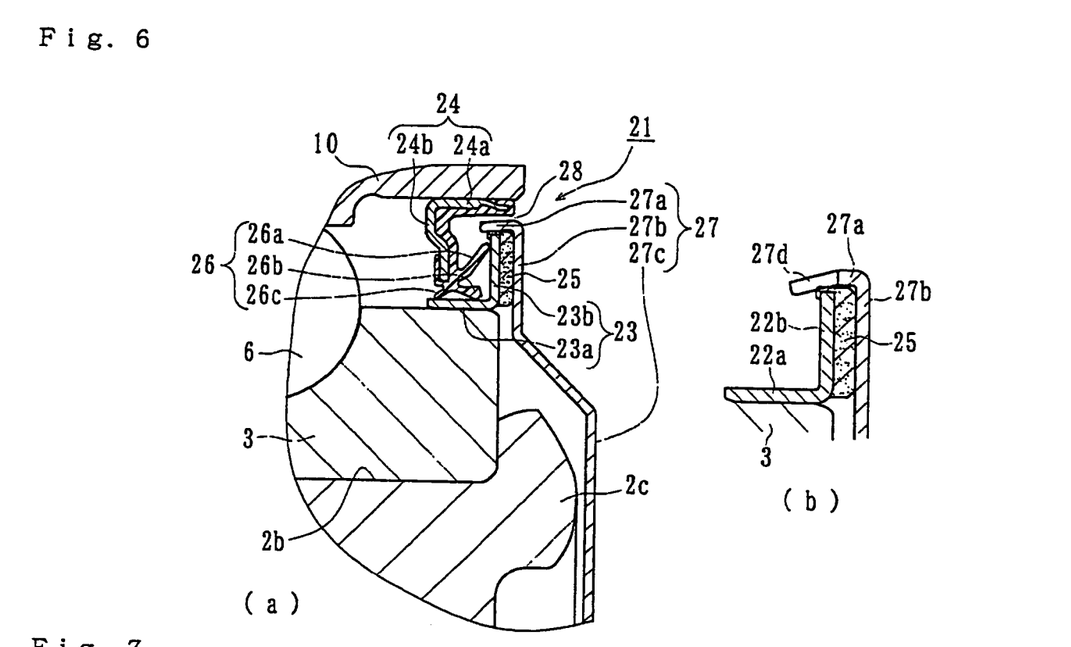
FIG. 6(a) is a partially enlarged longitudinal-section view of FIG. 5.
FIG. 6(b) is a modified embodiment of FIG. 6(a)
Figure 7:
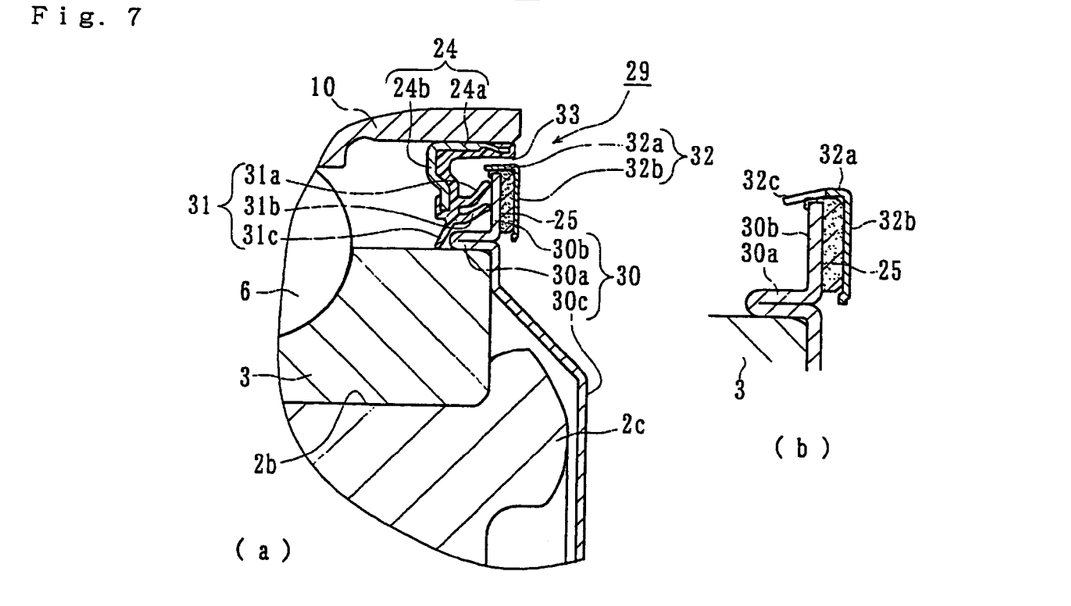
FIG. 7(a) is a partially enlarged longitudinal-section view of a fifth embodiment of a vehicle wheel bearing of the present invention.
FIG. 7(b) is a modified embodiment of FIG. 7(a)

A fifth embodiment of the vehicle wheel bearing is shown in a partially enlarged view of FIG. 7. Since difference of this embodiment from the fourth embodiment (FIG. 6) only resides in the structures of the first sealing plate and the protecting cover, same numerals are used as those used in the first embodiment to designate the same structural elements.

Similar to the first embodiment, the second sealing plate 24 is mounted on the outer member 10 of the sealing device 29 on the inboard side. A first sealing plate 30 is formed as a cap configuration integrally having folded cylindrical portion 30a, a radially extending portion 30b, extending radially outwardly from the end of the cylindrical portion 30a, and a bottom portion 30c to cover the end of the inner ring 3 and the caulked portion 2c. The plate 30 is fitted on the outer circumferential surface of the inner ring 3. The first sealing plate 30 is made by press working of ferrite-stainless steel sheet (e.g. JIS SUS 430 etc.) or preserved cold rolled steel sheet (e.g. JIS SPCC etc.). An encoder 25 is bonded, by vulcanization, integrally on the radially extending portion 30b. The encoder 25 is made of elastomer material with a magnetic substance powder.

The second sealing plate 24 has a cylindrical portion 24a and a radially extending portion 24b. The second sealing plate has a substantially "L" shaped configuration. A sealing member 31 is bonded, by vulcanization, on the second sealing plate 24. The sealing member 31 is integrally formed by a pair of side-lips 31a and 31b which slide-contact the radially extending portion 30b of the first sealing plate 30. A radial-lip 31c directly slide-contacts with the outer circumferential surface of the inner ring 3. Accordingly, the sealing member 31 makes it possible to positively prevent leakage of grease contained in the bearing as well as penetration of rain water or dusts into the bearing from ambient without any restriction as to the bearing space and the configuration or dimension of the sealing plate.

In this embodiment, a protecting cover 32 is mounted on the first sealing plate 30. The protecting cover 32 has a cylindrical portion 32a fitted on the outer circumferential surface of the first sealing plate 30. A radially extending portion 32b intimately contacts the encoder 25 to cover the surface. The protective cover 32 is formed to have a substantially "L"-shaped configuration. The protecting cover 32 is formed by press working a sheet of non-magnetic material e.g. an austenitic-stainless steel sheet (e.g. JIS SUS 304 etc.) or preserved cold rolled steel sheet (e.g. JIS SPCC etc.). The protecting cover 32 can be made of any non-magnetic material with a surface hardness higher than that of the encoder 25. The protecting cover 32 may be formed of any synthetic resin e.g. polypropylene, polyethylene etc. other than non-magnetic materials mentioned above.

The cylindrical portion 24a of the second sealing plate 24 and the cylindrical portion 32a of the protecting cover 32 are arranged opposed to each other and to keep a slight radial gap between them to form a labyrinth seal 28. As shown in FIG. 7(b), it is possible to positively and rigidly secure the protecting cover 32 to the first sealing plate 30 by plastically deforming the tip of the cylindrical portion 32a to form a caulked portion 32c.

The first sealing plate 30 is formed as a cap-shaped configuration and the exposed portions of the inner ring 3 and the caulked portion 2c are covered by the first sealing plate 30 and thus penetration of rain water or dust into the bearing can be prevented. In addition, since the inner ring 3 as well as the abutted surface between the end of the inner ring 3 and the caulked portion are never exposed to ambient, it is possible to prevent generation of rust in the inner ring 3. Accordingly, it is also possible to prevent delayed fracture due to penetration of diffusible hydrogen, which exists in ambient, into the metallographic structure of the inner ring 3 when corrosion would proceed in this portion.

In addition, since the surface of the encoder 25 is covered by the non-magnetic material of the radially extending portion 32b of the protecting cover 32, it is possible to prevent damage of the encoder 25 without having any influence on the detection accuracy. Furthermore, since the air gap between the encoder 25 and the vehicle speed detecting sensor can be substantially reduced, it is possible to further improve the detection accuracy.

The present invention has been described with reference to the preferred embodiment. Obviously, modifications and alternations will occur to those of ordinary skill in the art upon reading and understanding the preceding detailed description. It is intended that the present invention be construed as including all such alternations and modifications insofar as they come within the scope of the appended claims or the equivalents thereof.

What is claimed is:

1. A vehicle wheel bearing comprising:
    an inner member including a wheel hub integrally formed with a wheel mounting flange at one end, an inner raceway surface at an outer circumferential surface of said inner member and a stepped portion, of small diameter, axially extending from the inner raceway surfaces;
    an inner ring fitted on the stepped portion and formed with an another inner raceway surface at an outer circumferential surface;
    an outer member integrally formed with a body mounting at its periphery;
    double row outer raceway surfaces at an inner circumferential surface of said outer member opposite to the inner raceway surfaces;
    double row rolling elements arranged between the outer and inner members;
    sealing devices for sealing annular spaces between the outer and inner members;
    said inner ring is secured to the wheel hub in a non-axially movable fashion relative to the wheel hub by a caulked portion formed by plastically deforming a radially outward end of the stepped portion, of small diameter, of the wheel hub;
    a sealing device on an inboard side of the bearing, the sealing devices comprises a first sealing plate arranged on the inner ring and a second sealing plate arranged on the outer member opposite to the first sealing plate; said first sealing plate has a radially extending portion arranged at an inboard side of the bearing; an elastomeric material bonded on the radially extending portion of the first sealing plate, said elastomer material includes magnetic substance powder, North and South poles are alternately magnetized along the circumferential direction; said second sealing plate has a substantially "L"-shaped cross-section formed by a cylindrical portion and a radially extending portion; side-lip(s) slidingly contact the radially extending portion of the first sealing plate; the tip of the radially extending portion of the first sealing plate is positioned to keep a slight radial gap relative to the cylindrical portion of the second sealing plate; a non-elastomeric portion of the first sealing plate extending radially inward such that the exposed portion of the inner ring is entirely covered by said non-elastomeric portion.

2. A vehicle wheel bearing of claim 1, wherein the first sealing plate is formed as a cap with a fitted portion to be press-fitted on the outer circumferential surface of the inner ring and a bottom portion to cover the caulked portion.

3. A vehicle wheel bearing of claim 1, wherein the first sealing plate is formed as a disk configuration to abut the end face of the inner ring and is secured thereto by the caulked portion of the wheel hub.

4. A vehicle wheel bearing of claim 1, wherein the first sealing plate has a fitted portion to be press-fitted on the outer circumferential surface of the inner ring and a fixed portion to be secured to the end face of the inner ring by the caulked portion of the wheel hub, and a recess for containing the fixed portion is formed on the caulked portion.

5. A vehicle wheel bearing of claim 1, wherein the elastomer material is bonded to the first sealing plate over a region from the radially outermost end of the radially extending portion to a point of radially inward beyond the outer circumferential surface of the inner ring.

* * * * *

UNITED STATES PATENT AND TRADEMARK OFFICE
CERTIFICATE OF CORRECTION

| | |
|---|---|
| PATENT NO. | : 7,350,976 B2 |
| APPLICATION NO. | : 10/826549 |
| DATED | : April 1, 2008 |
| INVENTOR(S) | : Hisashi Ohtsuki et al. |

It is certified that error appears in the above-identified patent and that said Letters Patent is hereby corrected as shown below:

<u>Title Page</u>,
Insert the following heading and information:
-- [30] Foreign Application Priority Data

Apr. 17, 2003 [JP] …………..2003-112329
Jun. 20, 2003 [JP] …….….....2003-176574 --

Signed and Sealed this

Eighth Day of July, 2008

JON W. DUDAS
*Director of the United States Patent and Trademark Office*